Aug. 3, 1965   J. H. STAAK   3,198,908
MOTOR OPERATED CIRCUIT BREAKER
Filed Nov. 14, 1960   2 Sheets-Sheet 1

INVENTOR.
JULIUS H. STAAK
BY Robert H. Casey
ATTORNEY

Aug. 3, 1965  J. H. STAAK  3,198,908
MOTOR OPERATED CIRCUIT BREAKER
Filed Nov. 14, 1960  2 Sheets-Sheet 2
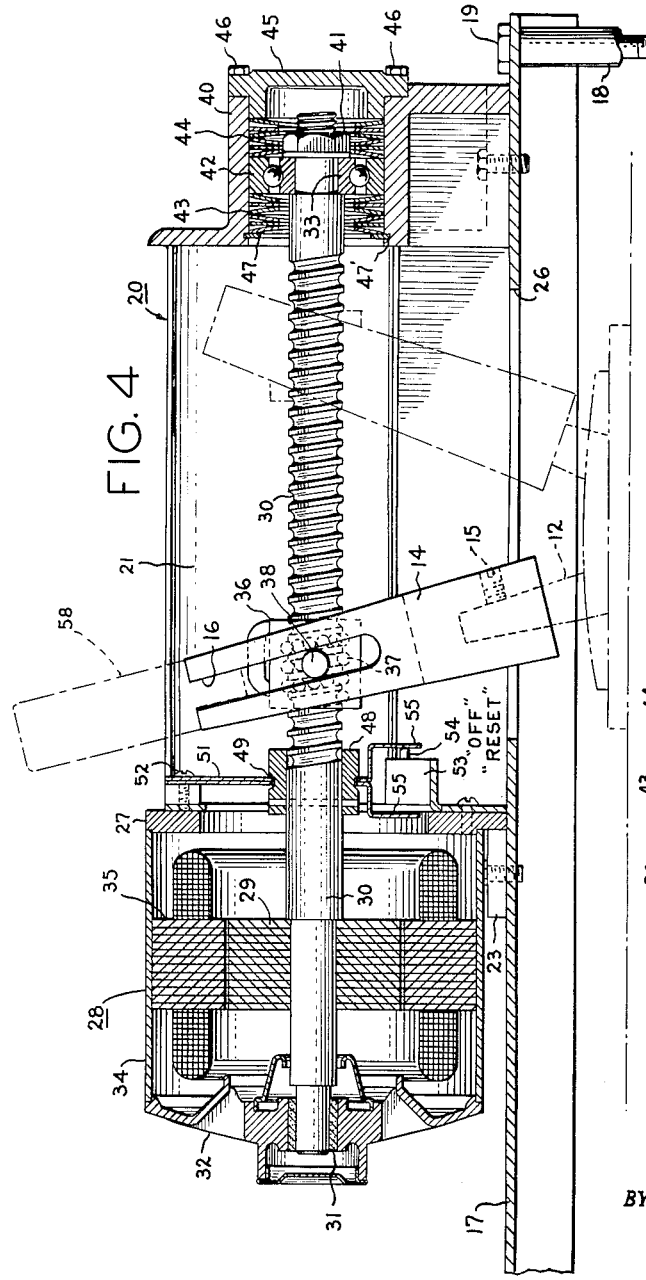
INVENTOR.
JULIUS H. STAAK
BY
Robert F. Casey
ATTORNEY United States Patent Office 3,198,908
Patented Aug. 3, 1965

3,198,908
MOTOR OPERATED CIRCUIT BREAKER
Julius H. Staak, Fort Wayne, Ind., assignor to General
Electric Company, a corporation of New York
Filed Nov. 14, 1960, Ser. No. 68,728
3 Claims. (Cl. 200—92)

My invention relates to electric circuit breakers and particularly to electric circuit breakers adapted for manual operation but also including electrically powered means for operating such circuit breakers.

The type of electric circuit breakers referred to include a molded insulating housing containing contacts, operating mechanism, current responsive means, and terminals for connecting the assembly in an electric circuit to be controlled. Such circuit breakers also include a manually engageable handle of molded insulating material projecting from the top surface thereof for operating the contacts.

While in most applications such manual operation is satisfactory, it is often desirable to provide means for operating such circuit breakers by electrical means. This is accomplished by mounting an electric motor on the insulating casing of the circuit breaker and connecting it to the manually operable handle. In this arrangement, it is often found that the inertia of the electric motor exerts a high force on the manually operating handle when the handle reaches its limits of movement, such force often causing breakage of the handle. While various means have been proposed for absorbing such inertia energy, such means have involved additional expense or complication in manufacture or have lacked a desirable degree of dependability.

It is an object of the present invention to provide an electric circuit breaker including electrically operated means for operating the mechanism thereof and simple and dependable means for absorbing the inertia energy of the moving parts thereof at the end point of each cycle of operation.

It is another object of the invention to provide an electric circuit breaker of the molded case type including motor-driven means for operating the manually engageable handle portion thereof and at the same time permitting manual operation thereof without the necessity of disconnecting any portions of the apparatus.

In accordance with the invention in one form, I utilize an electric circuit breaker including a molded insulating casing having a manually engageable handle projecting from the top surface thereof. An electric motor is mounted on the top surface of the circuit breaker casing and includes an operating shaft extending parallel to the top surface of the casing. The operating shaft comprises an extension of the shaft of the electric motor and includes a threaded portion carrying a travelling nut. The circuit breaker handle is provided with an extension having an engagement with the travelling nut. The circuit breaker handle includes a positive stop at each extreme of its movement, and for the purpose of absorbing the force of inertia of the moving parts at each extreme of movement, the operating shaft is made longitudinally slidable a small amount in each direction, and is resiliently maintained in a central normal position. When the circuit breaker handle encounters a stop at each extreme of its movement, the operating shaft continues to rotate in the same direction a small amount, thereby threading through the then stationary travelling nut, and compressing the resilient spring means, absorbing the force of inertia of the moving parts without exerting a substantial force on the circuit breaker handle.

In accordance with another aspect of the invention, means is provided whereby the longitudinal shifting of the operating shaft operates a switch to deenergize the motor and to condition the circuit for operation in the reverse direction.

My invention will be more completely understood from the following detailed description, and its scope will be set forth in the appended claims.

In the accompanying drawings,

FIGURE 4 is a side elevation view partially in section of a molded case electric circuit breaker including electric motor operating means in accordance with the invention, the circuit breaker proper being broken away;

Figure 1:
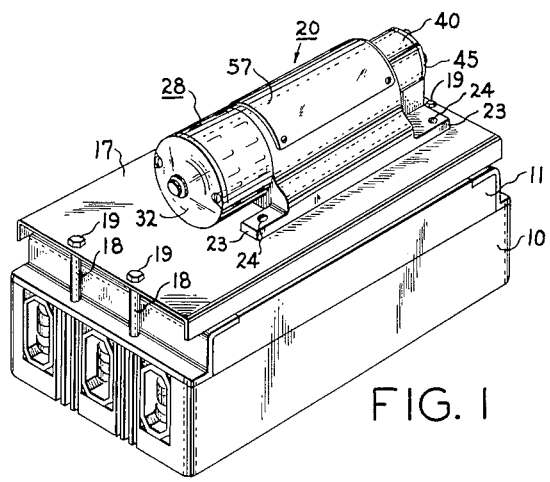
FIGURE 1 is a perspective view of an electrically-operated circuit breaker incorporating the invention.
Figure 2:
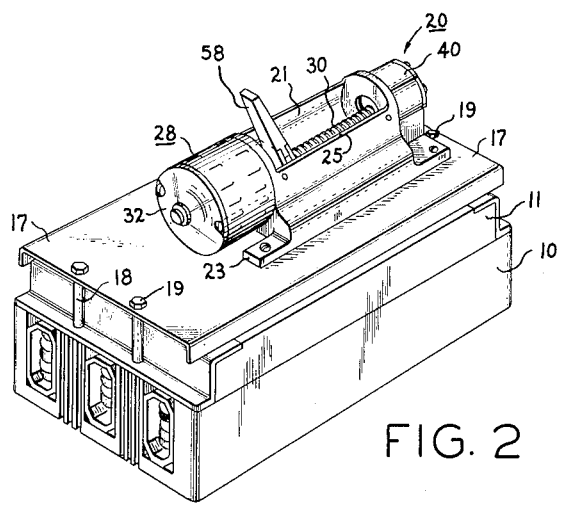
FIGURE 2 is a view similar to FIGURE 1, but showing the device during manual operation.
Figure 3:
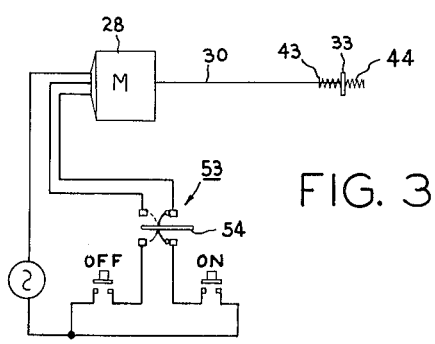
FIGURE 3 is a schematic drawing of a typical control circuit which may be used.

FIGURES 5, 6, and 7 are schematic representations of the apparatus shown in FIGURES 1–3, showing the functioning of the operating shaft on overtravel at one extreme of movement of the operating handle.

In the drawings, the invention is shown as incorporated in a motor-operated electric circuit breaker comprising a basic electric circuit breaker of conventional construction, indicated generally at 10 and including a molded insulating casing having a cover 11, and an operating handle 12 (see FIGURE 4), movable between "on" and "off" positions as indicated. If desired, the circuit breaker 10 may include an operating mechanism which automatically disconnects the contacts upon the occurrence of predetermined current conditions. In such cases, it is necessary that the mecahnism be reset or relatched after such automatic opening, before moving it again to the "on" position. Also, a "reset" position may be provided, which is the same as the "off" position, or slightly beyond the "off" position. In the present case, the invention is shown as utilized with an electric circuit breaker of the automatic opening type in which the "reset" position coincides with the "off" position.

For the purpose of facilitating motor-driven operation of the circuit breaker, in a manner to be described, a first handle extension 14 is provided, which is rigidly attached to the insulating handle 12 by suitable means such as by means of a set-screw 15. The handle extension 14 is bifurcated, so as to straddle the shaft 30, and has an opening in its bight portion adapted to fit over the outer portion of the insulating handle 12. The opposed side portions of the handle extension 14 are each provided with an elongated open-ended slot 16.

The apparatus further includes a main supporting plate 17 mounted on the top surface of the insulating casing 11 by suitable means such as by bushings 18 and mounting bolts 19 threadedly engaged in tapping inserts, not shown, embedded in the insulating casing 11. A combined housing and support member 20 is mounted on the plate 17 (see FIGURES 1 and 2). The combined housing and support member 20 comprises a casting having a generally cylindrical central body portion 21, a base portion 22, and mounting feet 23 fastened to the supporting plate 17 by suitable means such as by bolts 24. The central body portion 21 has an elongated aperature 25 in its top wall, and a corresponding elongated aperture 26 in its bottom wall, for a purpose to be described.

The end wall 27 of the housing 20 also serves as the end wall for the electric motor 28, which is therefore rigidly mounted on the plate 17. The electric motor 28 includes an armature 29 supported on a shaft 30. The shaft 30 is journalled at one end in a bearing 31 in the outer end bell or closure member 32 of the motor 28, and has its other end journalled in a bearing 33. The motor also includes a cylindrical housing 34, carrying the field assembly 35. The motor is retained in assembled relation by means of elongated bolts, 28a, passing through the end-bell 32 and into threaded engagement with the end wall 27, trapping the housing 34 between the end bell 32 and the end wall 27.

The intermediate portion of the shaft 30, which extends within the major portion of the housing 20, is threaded, and carries a travelling nut assembly 36 of the "Saginaw drive" type, including a series of recirculating ball bearings 37, to provide low frictional engagement with the threaded portion of the shaft. The assembly 36 also includes a pair of outwardly directed pins 38 which extend into the slots of the handle extension 14.

The operation of the apparatus as thus far described is such that when the motor 28 is energized, rotation of the armature and shaft 30 causes the travelling nut assembly 36 to travel longitudinally along the shaft 30, carrying with it the handle extension 14 and throwing the handle 12 from one extreme position to the other.

It will be understood that the armature 29 of the motor 28 and its shaft 30 rotate at high speeds during operation of the motor, as required by design requirements of the motor. As a result, a substantial amount of inertia energy is built up in these components during actuation of the device. Upon the handle reaching its extreme of travel, although the motor may be immediately denergized by suitable means, it is apparent that the armature and its associated shaft will continue to rotate because of inertia, producing a force tending to move the handle extension 14 and a handle 12 beyond the extreme position.

In order to avoid any undue strain on the handle extension 14 and the handle 12 because of such inertia action, the shaft 30 and the armature 29 are both made slidable a small amount as a whole longitudinally. For this purpose, the bearing 33 is slidably supported in the housing extension 40. The shaft 30 is reduced at this end and is fixedly attached to the central portion of a ball-beargin assembly by means of a retaining nut 41, which is threaded on the shaft 30. The outer or race portion 42 of the bearing 33, is slidably supported in the housing extension 40.

The ball bearing 33 as a whole is held in a "normal" position, as shown, by means of a series of conical spring washers 43 and 44. This assembly is retained in position in one direction by means of the end cap closure 45, which is held to the housing extension 40 by means of bolts 46. The spring washer assembly is retained in the other direction by means of an internal snap-ring 47 which is snapped into a groove 47 cut in the internal bore of the housing extension 40. It will be apparent, therefore, that the shaft 30 may be displaced slightly in either longitudinal direction against the force of the springs 43 or 44, and will be returned by the springs to its normal position as indicated.

A resilient member 51, is provided, supported on the end wall 27 by means of a screw 52. The lower end of the resilient member 51 is bifurcated and straddles a snap-switch 53, having a rectilinearly operating actuator 54 passing therethrough. The intermediate portion of the member 51 extends into a circumferential groove 49 in a collar 48 carried by and rotating with the shaft 39. Movement of the shaft 30 longitudinally carries the collar 48 with it and moves the member 51, causing the extensions 55 of the member 51 to engage the actuator 54 of the switch 53.

The snap switch 53 may be of the double-pole-double-throw type as indicated in FIGURE 3, serving to close one circuit and open another on each operation. When the switch 53 is in a given position, the corresponding push-button may be depressed, energizing the corresponding winding of the motor 28 for rotation in a given direction. When the switch 53 is in the opposite position, the other push-button may be used to energize the corresponding motor winding to cause rotation in the opposite direction.

In discussing the operation of the invention, it will first be assumed that the handle extension 14 has just been moved from right to left as viewed, to the position shown in FIGURE 5, in which it encounters a stop, shown schematically at 56. Continued rotation of the shaft 30 in the same direction causes the shaft 30 to move slightly to the right. This compresses the spring washers 44, and moves the operating projections 55 to the right, and the actuator of the snap switch 53 to the condition shown in FIGURE 6. Actuation of the switch 53 in this manner disconnects the motor from its source of power, and conditions it for actuation in the opposite direction, by operation of the circuit of FIGURE 3, as described above.

The armature 29 and the shaft 30 continue to rotate, because of inertia, even after the switch 53 has been actuated. This continued rotation causes a slight further translation or longitudinal shifting of the shaft 30, and compression of the conical spring washers 44 further. Such further compression of the spring washers 44 absorbs the stored inertia energy and prevents breakage of the operating handle 12 or of the extension 14.

When the armature and shaft stop rotating, the springs 44 act to return to their normal condition, returning the bearing 33 and the shaft 30 to its normal position.

It is important to note that the spring 44 must be carefully selected so that the force required to compress it is not too small, and not too great. If it were too small, for example, the reactive force on the shaft, which exists because of the force required to move the handle 12, would cause the shaft 30 to shift initially, rather than moving the handle. If the springs were too stiff, on the other hand, breakage of the handle might result.

Upon energizing the circuit for rotation of the motor in the opposite direction, the travelling nut is returned to the right extreme of movement until the handle extension 14 encounters a stop in that direction. Following this, the shaft 30 moves to the left as viewed, actuating the switch 53 and again deenergizing the motor 28. The force of inertia of the rotating parts in the case is absorbed by the springs 43, in a manner similar to that described in connection with springs 44.

It will be observed that the springs 43 and 44 perform the dual function of permitting the necessary travel of the shaft 30 in order to actuate the switch 53 to deenergize the motor following completion of the travel of the switch arm 14, and also of absorbing the inertia force of the rotating elements after the motor has been deenergized.

It will also be observed that if for any reason, the handle extension 14 encounters an obstacle to its movement which requires a substantially greater force to move it than is normally required, there will be a reaction upon the operating shaft 30 causing it to shift and actuate the cut-off switch 53 and deenergize the motor.

In order to permit manual operation of the circuit breaker when desired, the cover 57 is removed from the top aperture 25 in the housing 20 and a second handle extension 58 is inserted through the aperture 25 into engagement with the handle extension 14, as shown in FIGURE 2. Because of the low coefficient of friction of the travelling nut 36 on the shaft 30, it is possible to move the handle 12 by means of the outer handle extension 58, the shaft 30 rotating meanwhile as the nut 36 is pushed along the shaft. When the handle 12 is operated in this manner manually, the shaft 30 is rotated as previously described, at sufficient speed so that when the handle reaches its extreme of travel, the inertia of the parts serves to move the shaft 30 longitudinally and to operate the switch 53 in the same manner as previously described, so that when the assembly is again electrically operated, it will operate in the correct direction.

It will also be observed that if the control mechanism should get "out of phase" so that the electric motor tends to drive the operating handle further in the direction in which it has previously been moved, it will immediately encounter an obstacle and the net result will be to cause a reaction on the shaft 30 moving it in a direction longitudinally to cause actuation of the cutoff switch 53 and reconditioning of the electrical circuit. Repeated operation of the electric circuit will therefore cause the mechanism to operate in the correct direction.

While I have described my invention in one particular embodiment, it will be readily apparent that many modifications thereof may be made by those skilled in the art, and I therefore intend by the appended claims to cover all such modifications as fall within the true spirit and scope of the invention.

What I claim as new and desire to secure by Letters Patent of the United States is:

1. An electrically operated switching device comprising an electric switch having an insulating enclosure and a manually operable handle projecting from said insulating enclosure, an electric motor mounted adjacent said insulating casing and including a field winding and an armature, said armature having an elongated operating shaft having a threaded portion intermediate the ends thereof, means supporting said armature and said shaft for reciprocating longitudinal movement relative to said field winding, a travelling nut in engagement with said threaded portion, means connecting said travelling nut to said manually operable handle, and said shaft, resilient means opposing said longitudinal movement of said shaft, and means limiting movement of said handle, whereby continued rotation of said shaft after said handle encounters said limiting means causes longitudinal movement of said shaft and said armature against said biasing means.

2. The invention as set forth in claim 1 wherein said electrically operated switching device also includes an auxiliary switch mounted on said insulating casing and means for operating said switch upon said longitudinal movement of said operating shaft.

3. The invention as set forth in claim 1 wherein said switching device includes a housing enclosing said motor said shaft and said travelling nut, said housing having a bottom opening to receive said manually operable handle, a top opening, and a cover closing said top opening but removable to afford access to said manually operable handle.

References Cited by the Examiner

UNITED STATES PATENTS

| | | | |
|---|---|---|---|
| 1,719,517 | 7/29 | Moore | 318—475 |
| 2,119,626 | 6/38 | Hollaway | 200—47 |
| 2,239,400 | 4/41 | Pitt et al. | 200—47 |
| 2,253,170 | 8/41 | Dunham | 318—475 X |
| 2,315,582 | 4/43 | Blodgett | 318—436 X |
| 2,407,537 | 5/44 | Chapman | 318—469 |
| 2,864,912 | 12/58 | Schmidt | 200—92 |
| 2,870,288 | 1/59 | Schmidt | 318—436 |

ORIS L. RADER, *Primary Examiner.*

MILTON O. HIRSHFIELD, *Examiner.*